Figure 1:
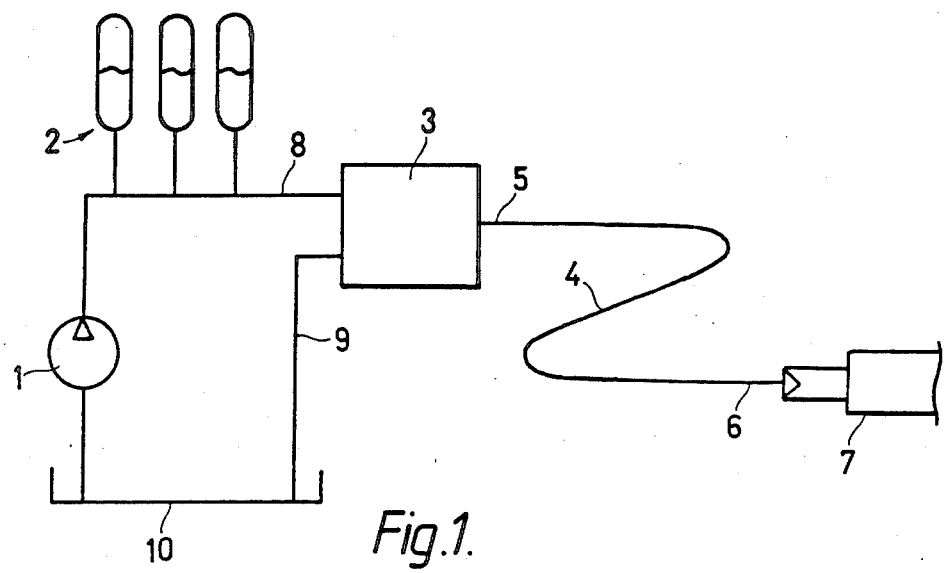

United States Patent [19]

Godal

[11] Patent Number: 4,687,014

[45] Date of Patent: Aug. 18, 1987

[54] METHOD AND APPARATUS FOR REDUCING THE RESPONSE TIME OF REMOTELY CONTROLLED, HYDRAULIC CONTROL SYSTEMS

[76] Inventor: Egil O. Godal, Ammerudveien 98, Oslo 9, Norway

[21] Appl. No.: 702,565

[22] Filed: Feb. 19, 1985

[30] Foreign Application Priority Data

Aug. 17, 1984 [NO] Norway ................................. 832958

[51] Int. Cl.$^4$ ........................................... G05D 16/00
[52] U.S. Cl. ................................... 137/14; 137/487.5; 137/624.14
[58] Field of Search ..................... 137/102, 116, 487.5, 137/624.14, 1, 14, 624.15

[56] References Cited

U.S. PATENT DOCUMENTS

| | | | |
|---|---|---|---|
| 3,329,153 | 7/1967 | Henry-Biabaud | 137/116 |
| 3,464,438 | 9/1969 | Maurer | 137/487.5 |
| 3,726,307 | 4/1973 | Carman et al. | 137/487.5 |
| 4,006,624 | 2/1977 | Annino et al. | 137/624.14 |
| 4,086,804 | 5/1978 | Ruby | 137/487.5 |
| 4,261,509 | 4/1981 | Anders et al. | 137/487.5 |
| 4,394,871 | 7/1983 | Czajka et al. | 137/487.5 |
| 4,456,038 | 6/1984 | Gwaltney et al. | 137/487.5 |

FOREIGN PATENT DOCUMENTS 2081777 2/1982 United Kingdom .

OTHER PUBLICATIONS

"The Transient Response of Fluid Lines," by F. T. Brown, *Journal of Basic Engineering*, Dec. 1962, pp. 547–553.

*Primary Examiner*—Alan Cohan
*Attorney, Agent, or Firm*—Sughrue, Mion, Zinn, Macpeak, and Seas

[57] ABSTRACT

A method and an apparatus for reducing the pressure response time of a hydraulic line (4) in a remotely controlled, hydraulic control system, wherein the hydraulic fluid supplied to the line (4) at the near end (5) thereof is subjected to a pressure admission for achieving a desired pressure level at the far end (6) of the line (4). By means of a pulsator means (3) the hydraulic fluid is subjected to a pulsed admission, so that the fluid flow is pulsed into or out of the line (4), dependent on whether the line is to be charged or discharged.

4 Claims, 3 Drawing Figures

METHOD AND APPARATUS FOR REDUCING THE RESPONSE TIME OF REMOTELY CONTROLLED, HYDRAULIC CONTROL SYSTEMS

The present invention relates to a method and an apparatus for reducing the pressure response time of a hydraulic line in a remotely controlled, hydraulic control system, wherein the hydraulic fluid supplied to the line at the near end thereof is subjected to a pressure admission for achieving a desired pressure level at the far end of the line, said pressure admission being varied for reducing the response time.

In control systems for subsea oil drilling installations it may be necessary to use hydraulic control lines having a length of several kilometers. Especially, this is the case on oil/gas fields on large ocean depths wherein it is topical to use a hydraulic control unit which is installed on the seabed at a great distance from the associated production platform or the like which is controlled by means of the control unit. In such control systems the pressure response time is a very important factor, and this should, i. a. for security reasons, be as small as possible.

In order to reduce the response time in the previously known hydraulic subsea control systems, one has used low-viscous liquids and/or rigid tubes in connection with a continuous pressure admission (pressure input), or one has increased the internal diameter of the pressure line. There is also known a method wherein a pulse change of a magnitude substantially greater than the step change in the input pressure is introduced in the pipeline for a time period shorter than the actuation time. However, this method presupposes that a pressure is available which is higher than the maintenance pressure, and it is not applicable when the maintenance pressure is equal to the maximally available pressure. When measuring the time response at the remote or far end of a long hydraulic line, it appears however that the pressure response time increases substantially when the operating pressure is increased above a certain limit, so that the response time under certain operating conditions becomes unacceptably long at the operating pressures which have to be used in practice.

The object of the invention is to provide a method and an apparatus involving a substantial reduction of the pressure response time in relation to what can be achieved with the previously known technique.

The above object is achieved with a method of the type set forth above which, according to the invention, is characterized in that the hydraulic fluid at the near end of the line is subjected to a continuously pulsed admission until the desired pressure level is achieved.

An apparatus for said purpose comprises a means for subjecting the hydraulic fluid supplied to the line at the near end thereof to a varying pressure admission for achieving a pressure response at the far end of the line, and is characterized in that said admission means comprises a pulsator means which is arranged for continuous pulsing of the fluid flow into or out of the line, dependent on whether the line is to be charged or discharged.

By subjecting the hydraulic fluid to a continuously pulsed adsmission, the present invention utilizes the fact that a certain transition time is required in order for a flow to pass from laminar to turbulent condition. With the same pressure difference in the system one will thereby achieve a larger rate of flow in the system than if the high, turbulent flow resistance is allowed to develop. Instead of waiting until a turbulent flow resistance is allowed to develop, the pulse is stopped and therewith the unfavourable flow resistance development, and the sequence is repeated with additional pulses, with the result that the average flow in the system increases, and the pressure therewith is built up in a correspondingly shorter time. By means of the method according to the invention one achieves that the average flow resistance in the line is substantially reduced, with the result that the line is charged or discharged significantly faster than if conventional technique was used in a corresponding system. Among the advantages achieved with a faster response on the hydraulic line, is that remotely controlled, hydraulic subsea control systems can be used at greater distances and/or with a cheaper tube system without exceeding maximal response times.

Figure 2:
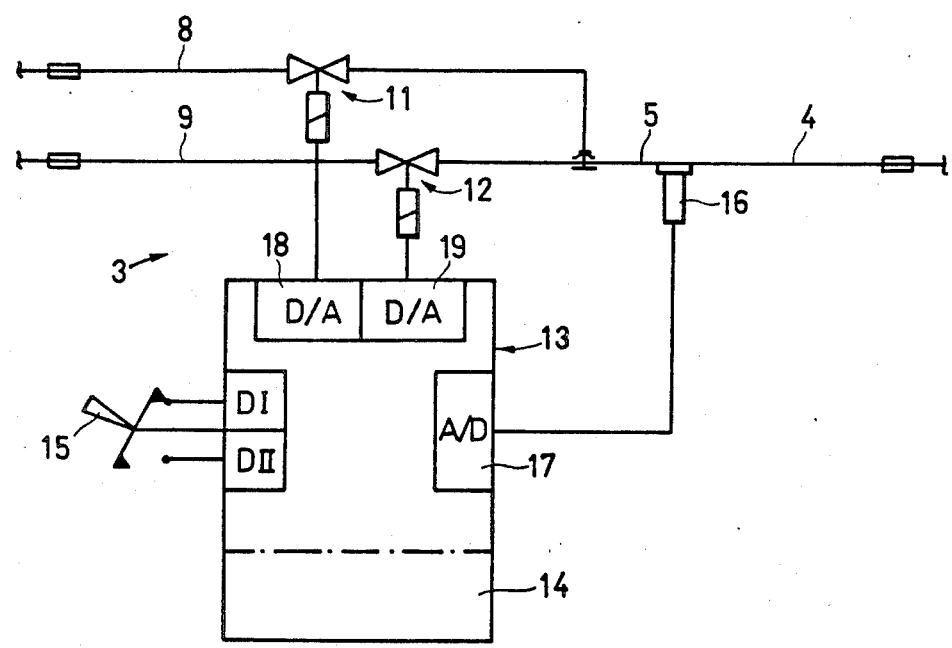
Figure 3:
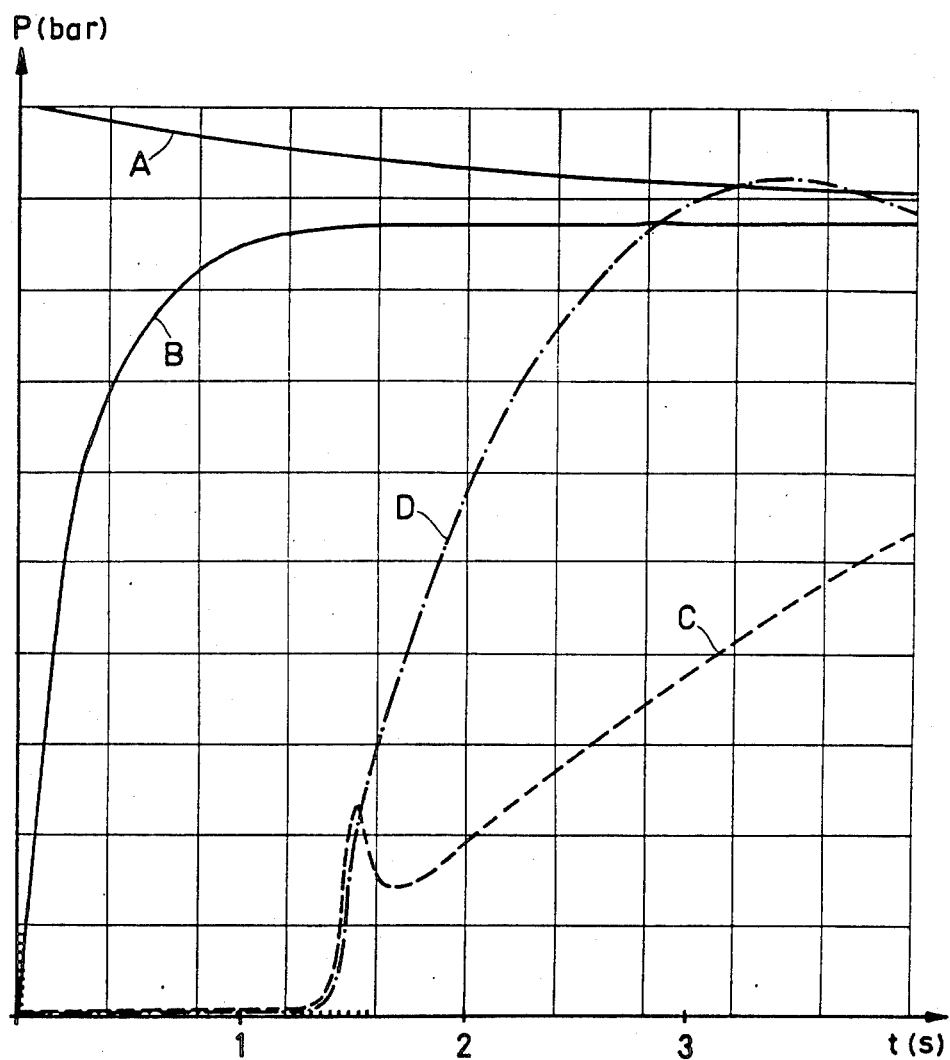

The invention will be further described below in connection with an exemplary embodiment with reference to the drawings, wherein FIG. 1 shows a schematic view of a hydraulic control system provided with an apparatus according to the invention;

FIG. 2 shows schematically an embodiment of the apparatus according to the invention; and FIG. 3 is a diagram showing the pressure response time of a conventional hydraulic control system and of a control system operating in accordance with the method according to the present invention.

The control system shown in FIG. 1 includes a pressure transmitter in the form of a pump 1 and an accumulator bank 2 which is connected through a pulsator means 3 to a hydraulic line 4 at the near end 5 of the line. The remote or far end 6 of the line connected to the controlled system, e. g. a wellhead etc. of an oil well, which is only represented by a partly shown valve 7. The pressure transmitter is connected to the pulsator means 3 through a supply line 8, whereas a return line 9 extends from the pulsator to a hydraulic fluid reservoir 10.

An embodiment of the pulsator means is more specifically shown in FIG. 2 wherein the same reference numerals as in FIG. 1 have been used for corresponding parts in FIGS. 1 and 2. The device includes a pair of continuously adjustable admission valves, more specifically a first valve 11 for pressure charging of the hydraulic line 4, and a second valve 12 for discharging the line. In the illustrated embodiment, the admission valves 11, 12 are controlled by an electronic control unit 13 which advantageously comprises a microprocessor 14. The microprocessor controls the admission valves in consideration of the actual values of a number of operating parameters which are of importance for the pressure time response, such as the elasticity, dimension and length of the pipeline, the elasticity, viscosity and density of the hydraulic fluid, the pipeline pressure and the supply or return pressure. Said parameters form part of the control algorithm of the microprocessor. Further, the microprocessor takes into consideration whether it is the question of a charging or discharging function, and for this purpose the control unit 13 is provided with digital inputs DI and DII which, upon actuation by a selector 15, give a message whether it is a charging or a discharging which is wanted.

A pressure sensor 16 is provided at the near end 5 of the line 4 for sensing the line pressure, and said sensor is connected to the control unit 13 through an analog-digital converter 17. Further, the control unit is coupled to the admission valves 11 and 12 through respective digital analog converters 18 and 19 converting the admission data of the microprocessor to suitable analog signals.

As mentioned, the function of the pulsator means is to pulse the fluid or liquid flow into or out of the hydraulic line 4 in dependence on whether the line is to be charged or discharged. The actual pressure pulses are formed by the control system of the microprocessor which, in dependence on the measured line pressure, varies the drive of the admission valves in such a manner that the desired pressure profile is obtained. The actual pressure profile may, for each pulse, advantageously be shaped as a e. g. linear ramp function which is positively-going or negatively-going in dependence on whether it is the question of charging or discharging.

When a pressure pulse at the near end of the line goes into saturation, the admission valve is immediately closed and remains closed for a period of time. The time during which the valve will be closed, will depend on the rate of flow of the liquid and the pressure step height. When the liquid rate of flow and the pressure step height becomes sufficiently small, the closing time will approach zero, and after the last ramp admission the admission valve will be constantly open.

In FIG. 3 there is shown a graphical representation of the pressure response (in bars) as a function of the time (in seconds) when charging a hydraulic line, for a conventional hydraulic control system as well as for a system operating in accordance with the method according to the present invention. The curves A, B and C apply to a conventional system, the curve A showing the pressure admission from the pressure generator in question, curve B showing the pressure development at the near end of the line, and curve C showing the pressure response at the far end of the line. The dash-dotted curve D shows the pressure response of a system according to the invention. As it will appear, the method according to the invention results in a substantial reduction of the response time in the operating pressure range (100–150 bars) which is of interest in practice.

The curves in the diagram have been produced by means of advanced mathematical simulating models, and the illustrated response curves apply to a hydraulic line with the following parameters:
Type: SAE 100 R1A
Length: 1000 m
Dimension: $\frac{3}{8}''$
Viscosity of liquid: 2 cst.
Density of liquid: 1000 kg/m$^3$.
I claim:

1. In a method for reducing the pressure response time of a hydraulic line in a remotely controlled, hydraulic control system, said line having a near end and a far end, and wherein said method comprises the step of supplying hydraulic fluid to the line at the near end under admission pressure for achieving a desired pressure level at the far end of the line, and varying said admission pressure for reducing the response time, the improvement comprising the step of subjecting the hydraulic fluid at the near end of the line to continuously pulsed pressure admission until said desired pressure level is achieved, and terminating each individual hydraulic fluid pulse essentially short of the transition time between flow passing from laminar to turbulent condition within the line and repeating the sequence with additional pulses thereby increasing the average fluid flow within the line to build up the pressure therein in a correspondingly shorter time.

2. A method according to claim 1, wherein said pulse pressure admission of said hydraulic fluid is through an admission valve means, and wherein said method further comprises the step of sensing the fluid pressure at the near end of the line and varying the drive of said admission valve means in dependence on said sensed pressure for achieving a desired pressure profile in the line.

3. An apparatus for reducing the pressure response time of a hydraulic line in a remotely controlled, hydraulic control system, said line having a near end and a far end, said apparatus comprising a means for subjecting the hydraulic fluid supplied to the line at the near end thereof to a varying pressure admission for achieving a pressure response at the far end of the line, said means comprising a pulsator means for continuously pulsing of the fluid flow into or out of the line, in dependence on whether the line is to charged or discharged, until the desired pressure level is achieved, and wherein said pulsator means further comprises means for terminating each individual pulse application essentially short of the transition time between flow passage from laminar to turbulent condition within the line and repeating the sequence with additional pulses to thereby increase the average fluid flow within the line to build up the pressure therein in a corresponding shorter time.

4. The apparatus according to claim 3, further comprising adjustable admission valves for charging and discharging hydraulic fluid to and from said line respectively, a means for sensing the fluid pressure at the near end of the line, and a control means operably connected to said sensing means and to said admission valve for varying the drive of the admission valves in dependence on the sensed pressure for achieving a desired pressure profile in the line.

* * * * *